(12) United States Patent
Kassan et al.

(10) Patent No.: US 11,312,401 B2
(45) Date of Patent: Apr. 26, 2022

(54) ELECTROMAGNETIC RAIL BRAKE DEVICE WITH A CONNECTOR BODY OF AN ELECTRIC CONNECTOR, WHICH CONNECTOR BODY IS ARRANGED ON A FREE SURFACE

(71) Applicant: KNORR-BREMSE GESELLSCHAFT MIT BESCHRÄNKTER HAFTUNG, Mödling (AT)

(72) Inventors: Michael Kassan, Steinabrückl (AT); Hermann Koidl, Wein (AT)

(73) Assignee: KNORR-BREMSE GESELLSCHAFT MIT BESCHRÄNKTER HAFTUNG

( * ) Notice: Subject to any disclaimer, the term of this patent is extended or adjusted under 35 U.S.C. 154(b) by 61 days.

(21) Appl. No.: 16/652,284

(22) PCT Filed: Sep. 19, 2018

(86) PCT No.: PCT/EP2018/075265
§ 371 (c)(1),
(2) Date: Mar. 30, 2020

(87) PCT Pub. No.: WO2019/063366
PCT Pub. Date: Apr. 4, 2019

(65) Prior Publication Data
US 2020/0239047 A1 Jul. 30, 2020

(30) Foreign Application Priority Data
Sep. 29, 2017 (DE) .................... 10 2017 009 157.9

(51) Int. Cl.
*B61H 7/08* (2006.01)
*B60T 13/74* (2006.01)
(Continued)

(52) U.S. Cl.
CPC .............. *B61H 7/08* (2013.01); *B60T 13/748* (2013.01); *F16D 63/002* (2013.01); *F16D 2121/20* (2013.01)

(58) Field of Classification Search
CPC ..... B61H 7/08; F16D 2121/00; F16D 63/002; F16D 2121/20; B60T 13/748
See application file for complete search history.

(56) References Cited

U.S. PATENT DOCUMENTS 1,914,998 A 6/1933 Looker
6,953,107 B2 * 10/2005 Lehmann ................. B61H 7/08
188/165

(Continued)

FOREIGN PATENT DOCUMENTS

CH 70080 A 9/1915
DE 102004018009 B3 10/2005

(Continued)

OTHER PUBLICATIONS

Translation of German Patent No. DE 102012007967 obtained from website: https://worldwide.espacenet.com/ on Dec. 8, 2021.*

(Continued)

*Primary Examiner* — Pamela Rodriguez
(74) *Attorney, Agent, or Firm* — Barnes & Thornburg LLP (57) ABSTRACT

An electromagnetic rail brake device of a rail vehicle having at least one brake magnet which has a magnet coil body and at least one magnetic core, and wherein the magnet coil body carries at least one magnet coil winding, and having an electric connector device, by way of which the at least one magnet coil winding is supplied with current, wherein the electric connector device has at least one pin-shaped electric connector body which is connected via a releasable electric connection to at least one current-conducting electric cable which is guided from the outside to the at least one pin- (Continued)

shaped connector body in relation to the brake magnet. The at least one pin-shaped electric connector body may be arranged on a free and outer surface of the magnet coil body or an element which is connected to the magnet coil body.

8 Claims, 4 Drawing Sheets (51) Int. Cl.
 *F16D 63/00* (2006.01)
 *F16D 121/20* (2012.01)

(56) References Cited

U.S. PATENT DOCUMENTS

| | | | | |
|---|---|---|---|---|
| 8,033,365 | B2 * | 10/2011 | Kassan | B61H 7/08 188/165 |
| 9,358,992 | B2 * | 6/2016 | Lehmann | B60T 1/14 |
| 2010/0101898 | A1 * | 4/2010 | Kassan | B61H 7/08 188/41 |
| 2010/0116602 | A1 | 5/2010 | Lehmann et al. | |
| 2017/0080959 | A1 | 3/2017 | Rathammer et al. | |

FOREIGN PATENT DOCUMENTS

| | | |
|---|---|---|
| DE | 102007014357 A1 | 10/2008 |
| DE | 102012007967 A1 | 11/2012 |
| DE | 102014208112 A1 | 10/2015 |
| WO | 2005100122 A1 | 10/2005 |
| WO | WO-2019/016091 A1 * | 1/2019 |

OTHER PUBLICATIONS

International Search Report corresponding to PCT/EP2018/075265, dated Dec. 13, 2018.

* cited by examiner

ELECTROMAGNETIC RAIL BRAKE DEVICE WITH A CONNECTOR BODY OF AN ELECTRIC CONNECTOR, WHICH CONNECTOR BODY IS ARRANGED ON A FREE SURFACE

CROSS REFERENCE AND PRIORITY CLAIM

This patent application is a U.S. National Phase of International Patent Application No. PCT/EP2018/075265 filed Sep. 19, 2018, which claims priority to German Patent Application No. 10 2017 009 157.9, the disclosure of which being incorporated herein by reference in their entireties.

FIELD

The disclosed embodiments relate to an electromagnetic rail brake device of a rail vehicle and to a rail vehicle having such a device.

BACKGROUND

In principle, two different types of electromagnetic rail brake devices can be differentiated according to their structural design.

On the one hand, the electromagnetic rail brake device can be a rigid electromagnetic rail brake device in which the brake magnets are rigid magnets, wherein a brake magnet has a magnetic coil body which is screwed to two parts of a magnetic core which are separated in the longitudinal direction in the region of the pole shoes of their limbs in the gap by an intermediate body made of nonmagnetic material. The nonmagnetic material of the intermediate body serves to avoid a magnetic short-circuit between the pole shoes. Rigid electromagnetic rail brake devices are mostly used for local transportation with trams and city railroads.

Furthermore, the articulated electromagnetic rail brake devices in question here are known, having articulated electromagnets as brake magnets, in which the magnetic coil body has dividing walls and chambers arranged between them. Magnetic cores are secured in the chambers between the dividing walls in such a way that they can move in a limited degree and orient themselves during the braking process in order to be able to follow rough parts of the surface of the rail head. In this case, the pole shoes are formed on the end faces, facing the rail, of the magnetic cores of the intermediate elements. Articulated electromagnetic rail brake devices are used on a standard basis in standard-gauge railroads.

The magnitude of the braking force of an electromagnetic rail brake device is dependent inter alia on the magnetic flux of the magnetic circuit, i.e. also on the geometry of the magnetic core or magnetic cores, on the magnetic electromotive force and on the frictional conditions between the brake magnet and the rail.

SUMMARY

Disclosed embodiments relate to an electromagnetic rail brake device of a rail vehicle having at least one brake magnet which has a magnetic coil body and at least one magnetic core, and wherein the magnetic coil body carries at least one magnetic core winding, and having an electric connecting device through which the at least one magnetic coil winding is supplied with power, wherein the electric connecting device has at least one pin-shaped electric connecting body and is connected via a releasable electric connection to at least one current-conducting electric cable which is led into the at least one pin-shaped connector body from the outside with respect to the brake magnet and to a rail vehicle having such an electromagnetic rail brake device.

The force-generating main component of an electric electromagnetic rail brake device is the brake magnet. In principle it is an electromagnet composed of a magnetic coil which extends in the direction of the rail and is carried by a magnetic coil body, and a horseshoe-shaped magnetic core. The horseshoe-shaped magnetic core forms pole shoes on its surface facing the vehicle rail. The direct current flowing in the magnetic coil brings about a magnetic voltage which generates a magnetic flux in the magnetic core, which flux is short-circuited via the rail head as soon as the brake magnet rests with its pole shoes on the rail. As a result, a magnetic attraction force comes about between the brake magnet and the rail. The kinetic energy of the moved rail vehicle causes the electromagnetic rail brake device to be pulled along the rail via drivers. In this context, the sliding friction between the brake magnet and the rail in conjunction with the magnetic attraction force gives rise to a braking force.

BRIEF DESCRIPTION OF THE FIGURES

The disclosed embodiments will now be explained by way of example with reference to the accompanying drawings and on the basis of disclosed embodiments, in which.

DETAILED DESCRIPTION

An electromagnetic rail brake device of the generic type is described in the previously unpublished document DE 10 2017 006 736.8 where the device is implemented as an articulated electromagnetic rail brake device. In the document, an electric connecting device for an electric cable through which the magnetic coil winding is supplied with current is arranged at an end element of a magnetic core. The electric connecting device has there in each case in a recess on a side face of the end element a pin-shaped electric connection which is then arranged within the recess and to which an electric cable for the positive pole and for the negative pole are respectively connected. The electric cables are each led via a drilled hole in the end element to the respective pin-shaped electric connection which is arranged in the recess, wherein the drilled hole is formed in one of the surface of the end element pointing away from the rail and opens into the recess. As a result, the electric connecting device is of a relatively complex design. Furthermore, disconnection of the two electrical cables from the internal pin-shaped electric connections is relatively complicated.

In contrast, disclosed embodiments provide an electromagnetic rail brake device of the type mentioned at the beginning in such a way that the formation of contact with the electrical connections for the magnetic coil is easier to handle. Furthermore, the intention is also to make available a rail vehicle with such an electromagnetic rail brake device.

Disclosed embodiments are based on an electromagnetic rail brake device of a rail vehicle having at least one brake magnet which has a magnetic coil body and at least one magnetic core, and wherein the magnetic coil body carries at least one magnetic core winding, and having an electric connecting device through which the at least one magnetic coil winding is supplied with power, wherein the electric connecting device has at least one pin-shaped electric connecting body and is connected via a releasable electric connection to at least one current-conducting electric cable which is led into the at least one pin-shaped connector body from the outside with respect to the brake magnet.

According to the disclosed embodiments, there is provision that the at least one pin-shaped connector body is arranged on a free and outer surface of the magnetic coil body or of an element which is connected to the magnetic coil body. In particular, the free and outer surface from which the at least one pin-shaped connector body projects outward is located outside any recesses, drilled holes or openings in the magnetic coil body or the element which is connected to the magnetic coil body. In other words, the at least one pin-shaped connector body is arranged on the free and outer surface of the magnetic coil body or of the element connected to the magnetic coil body in such a way that it is freely accessible from the outside.

Overall, for example two current-conducting electric cables may be present, a first electric cable as a positive pole and a second electric cable as a negative pole, wherein the first electric cable which represents the positive pole is releasably connected to a first pin-shaped electric connector body via a first releasable connection, and the second electric cable which represents the negative pole is releasably connected to a second pin-shaped electric connector body via a second releasable connection. In particular, the two pin-shaped electric connector bodies can be implemented in an identical fashion.

The at least one pin-shaped connector body has, for example, a circular cross section. However, other cross sections such as, for example, square, rectangular or polygonal cross sections are also possible.

The at least one pin-shaped electric connector body can be secured in a drilled hole of the free surface which points outward and can project outward from there. In the interior of the drilled hole of the magnetic coil body or in the element connected thereto, the at least one pin-shaped electric connector body can then be connected to the magnetic coil by a further electric cable. For reasons of insolation, an electrically insulating sleeve or bushing can be arranged between the at least one pin-shaped electric connector body and a radially inner circumferential face of the drilled hole, in order to avoid an uncontrolled flow of current within the magnetic coil body.

The purpose of the at least one pin-shaped electric connector body is, therefore, to input electrical energy or electric current from the current-conducting electric cable into the at least one pin-shaped electric body via the releasable electric connection, which electric body has an electrically conductive connection to the magnetic coil in order then to energize the coil.

The advantage of the disclosed embodiments is thus that the releasable electric connection between the at least one pin-shaped electric connector body and a pole contact which is arranged, for example, at an end of the at least one current-conducting electric cable, is freely accessible and can, therefore, be connected and released quickly and easily. Repairs to the releasable electric connection or to the at least one pin-shaped electric connector body are then also easily possible.

The releasable electric connection can, for example, be a positively locking and/or frictionally locking connection and be established, for example, using a screwed connection, clamped connection or pressed connection of the pole contact to the at least one pin-shaped connector body.

Particularly good accessibility of the at least one pin-shaped electric connector body is provided if it projects perpendicularly away from the free and outer surface.

According to one development, the at least one pin-shaped electric connector body can have a truncated-cone-shaped cross section which widens toward the free and outer surface. This is advantageous, in particular, when the pole contact is embodied as a ring, and for the purpose of connection the ring has to be fitted onto the pin-shaped connector body.

In particular, the at least one current-conducting electric cable can, therefore, have at the end a pole contact which is connected to the pin-shaped connector body by the releasable electric connection.

The releasable electric connection can contain a positively locking and/or frictionally locking connection such as a screwed connection and/or a clamped connection and/or a pressed connection of the pole contact to the pin-shaped electric connector body.

According to a first embodiment, the at least one electric cable is provided at the end with a pole terminal which is connected to the at least one pin-shaped connector body by a clamped connection.

The pole terminal can optionally have a ring with a through-opening whose internal diameter can be varied and in an initial state is larger than the outer diameter of the pin-shaped electric connector body, wherein the annular pole terminal can be connected directly to the at least one pin-shaped electric connector body in such a way that the at least one pin-shaped connector body is initially introduced into the through-opening of the ring of the pole terminal, and then the internal diameter of the through-opening of the ring is reduced until the pin-shaped electric connector body is clamped in a frictionally locking fashion in the ring of the pole terminal.

In this context, the ring can have, when viewed in the circumferential direction, an annular gap on which ring ends are formed whose distance from one another can be varied using an adjuster screw in order to vary the internal diameter of the ring. The releasable electric connection is then optionally embodied in the manner of an electric contact-forming means, such as also occurs in batteries of road vehicles but is not customary in the field of electromagnetic rail brakes.

According to a second embodiment, the at least one pin-shaped electric connector body can be formed by a head screw which can be screwed into a threaded bore of a threaded bushing which is electrically insulated with respect to the magnetic coil body or the element connected thereto and is secured in a drilled hole in the free and outer surface, wherein a screw shaft of the head screw projects through a pole contact which is embodied as a cable lug and to which the at least one current conducting electric cable is electrically connected. The electric releasable connection can then be released only by releasing the screwed connection between the head screw and the threaded drilled hole.

In the electromagnetic rail brake device, in particular an end element can be rigidly connected to the magnetic coil body at each of the longitudinal ends of the magnetic coil body, wherein the at least one pin-shaped electric connector body is arranged on a free and outer surface of the end element.

The surface can generally have a surface normal perpendicularly to or parallel to the rail and, when viewed in the position of use, be arranged above, below, to the side or at the ends of the magnetic coil body or on the element connected thereto. In particular, the free and outer surface can be a surface which points away from the rail and vertically upward in the position of use. The releasable connection is then easily accessible from above. Alternatively, the surface can, however, also be arranged at the ends or laterally on the magnetic coil body or on the element connected thereto.

In particular, the electromagnetic rail brake device can also be embodied as a rigid electromagnetic rail brake device described at the beginning or as an articulated electromagnetic rail brake device described at the beginning.

The disclosed embodiments also relates to a rail vehicle having an electromagnetic rail brake device described herein. Within the scope of the disclosed embodiments, a rail vehicle can denote one or more cars with or without their own drive and/or a tractor vehicle in any desired combination. In particular, a rail vehicle can have a power car. A rail vehicle or a car of the rail vehicle can have bogeys on which wheel axles of the vehicle are arranged. The bogeys can be attached to a car body. An electromagnetic rail brake device as described herein is then optionally suspended from a bogey in a vertically adjustable fashion.

Figure 1:
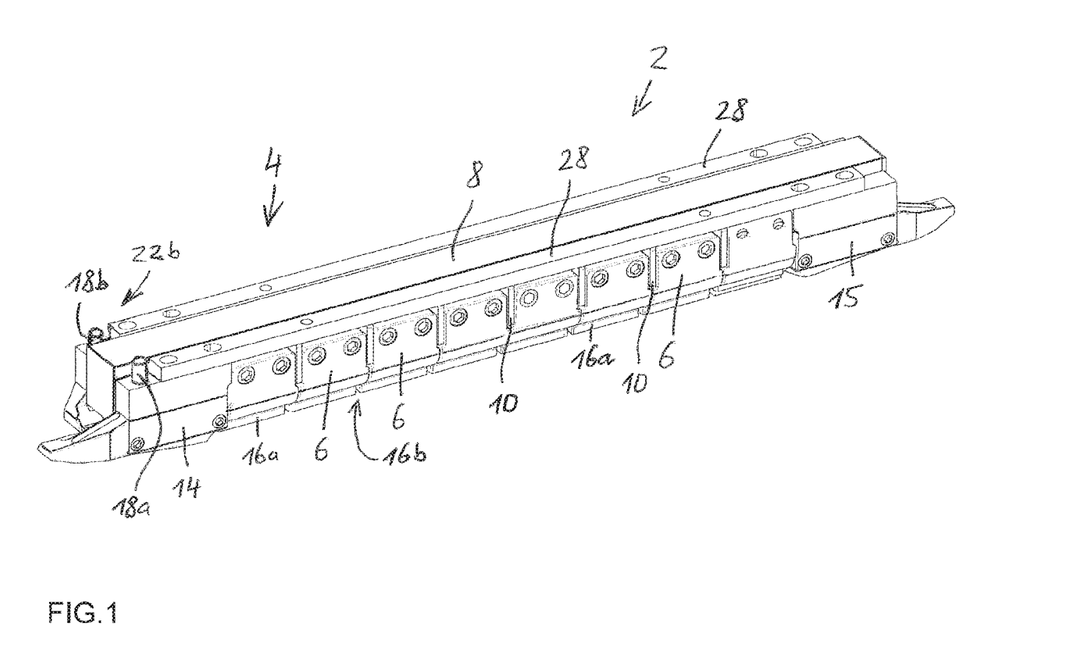
FIG. 1 shows a perspective illustration of an articulated electromagnet of an articulated electromagnetic rail brake device as a disclosed embodiment of an electromagnetic rail brake device according to the disclosed embodiments.

In order to be able to adapt better to rough surface areas of a rail 1 of a track, in an embodiment of an articulated electromagnet 2, illustrated in FIG. 1, of an electromagnetic rail brake device which is optionally embodied as an articulated electromagnetic rail brake device 4 there are a plurality of intermediate elements 6 which are secured so as to be movable in a limited fashion on a magnetic coil body 8 which extends in the longitudinal direction of the rail (not shown here). This is optionally achieved in that the intermediate elements 6 have magnetic cores which are suspended symmetrically with respect to a vertical central plane on the side faces, pointing away from one another, of the magnetic coil body 8 in chambers formed between dividing walls 10, such that the magnetic cores can tilt and pivot to a limited extent. End elements 14, 15, a first end element 14 and a second end element are each arranged on the ends of the magnetic coil body 8 and are optionally rigidly connected thereto.

FIG. 1 shows, for reasons of scale, just one of the articulated electromagnets 2 which interact with a rail, but a further articulated electromagnet 2 (not shown here) is present in a mirror-symmetrical fashion with respect to a perpendicular longitudinal center plane of the two rails of the track. The two articulated electromagnets 2 are then connected to one another via crossmembers (not shown here). Using an attachment device (not shown here), the articulated electromagnets 2 are attached to a lifting device which brings about vertical lifting of the articulated electromagnets 2, in order to move the intermediate elements 6 into contact with a rail head of the respective rail. The lifting device is in turn secured to a bogey of the rail vehicle.

For example, in each case a bar 28 is releasably attached to the two free surfaces of the magnetic coil body 8 which point away from the rail. Then, the bars 28 can be releasably attached to the lifting device by which the articulated electromagnet 2 can then be vertically adjusted.

The transmission of the braking forces to the magnetic coil body 8 is then carried out from the contact point of the intermediate element 6 via the dividing walls 10 and end pieces 14, 15 which are rigidly connected to the magnetic coil body 8 and provide good guidance to the articulated electromagnet 2 over railway switches and rail joints. The magnetic coil body 8, which carries at least one magnetic coil which cannot be seen from the outside, consequently carries the intermediate elements 6 which together form a magnetic core of the brake magnet 2.

The magnetic coil body 8 serves to accommodate the windings of the magnetic coil which are necessary to achieve the necessary electromagnetic flux. The dividing walls 10 are divided at uniform intervals in a through-opening of the magnetic coil body, which can be embodied in an oval or rectangular fashion, and the dividing walls 10 are secured in their positions to the magnetic coil body 8. Magnetic cores, which are horseshoe-shaped in cross section and receive the magnetic flux, of the intermediate element 6 are then inserted into the through-opening between in each case two such dividing walls 10.

The end elements 14, 15 are rigidly connected to the magnetic coil body 8, for example by welding. An upper truss, a lower truss and the end elements 14, 15 of the magnetic coil body 8 each form here, for example, a U-shaped profile rail, wherein the winding of the magnetic core is arranged running around in a groove-like winding space, open toward the outside, of the U-shaped profile rail.

The magnetic cores, not shown here in detail, of the intermediate element 6 also have, in a known fashion, a horseshoe-shaped cross section with a web from which two limbs project away transversely downward. In this context, the magnetic core is embodied in two parts, wherein a first part comprises a first half of the web, a first limb and a first pole shoe 16a, and a second part, separate from the first part, comprises a second half of the web, a second limb and a second pole shoe 16b. The first half and the second half of the web of the magnetic core then project through the through-opening of the magnetic coil body 8 and are attached to one another using a, for example, horizontal screwed connection.

The pole shoes 16a, 16b of the intermediate elements 6 are optionally composed of a friction material, e.g. of steel, spheroidal graphite or sintered materials. An intermediate body which fills in the gap, is nonmagnetic and temperature-resistant and is not shown here can then be arranged in a gap between the two pole shoes 16a, 16b.

Figure 2:
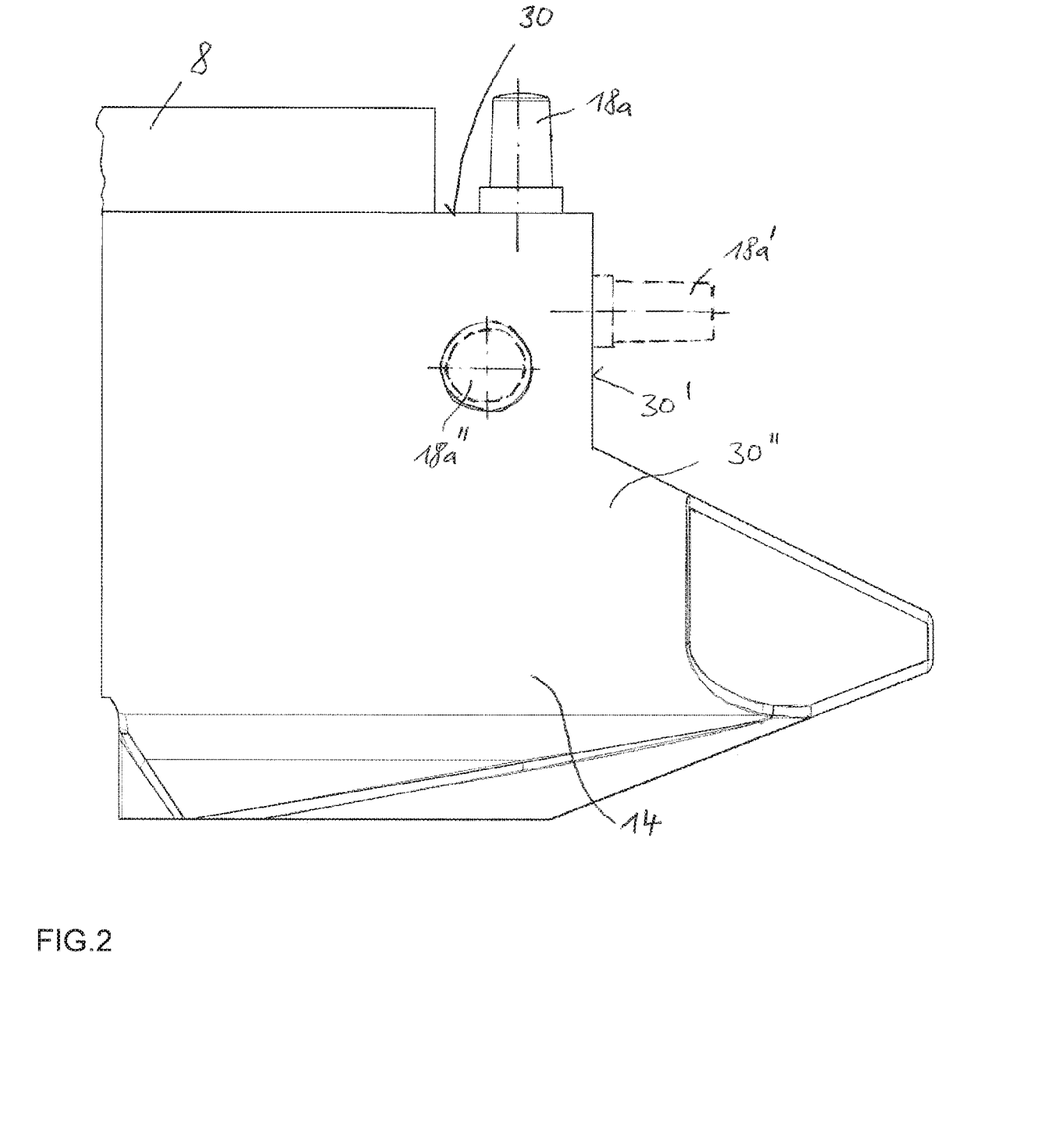
FIG. 2 shows a side view of an end element of the magnetic coil body with a plurality of pin-shaped connector bodies according to a first embodiment, the connector bodies being each arranged at a free and outer surface of the end element.

From FIG. 1 and FIG. 2 it is apparent that an electric connecting device 26, by which the magnetic coil is supplied with current, is arranged, for example, on the first end element 14.

The electric connecting device 26 has here two pin-shaped electric connector bodies 18a, 18b to which electric and current-conducting cables 20a, 20b for the positive pole and for the negative pole are connected via releasable connections 22a, 22b. Overall, there are, therefore, two electric cables 20a and 20b, a first electric cable 20a as a positive pole and a second electric cable 20b as a negative pole, wherein the first electric cable 20a which represents the positive pole is releasably connected to a first pin-shaped electric connector body 18a via a first releasable connection 22a, and the second electric cable 20b which represents the negative pole is releasably connected to a second pin-shaped electric connector body 18b via a second releasable connection 22b.

On the other hand, a further electric cable (not shown here) is connected to each of the two pin-shaped electric connector bodies in the interior of the first end element 14, which cable is connected at the other end to the magnetic coil in order to conduct into the magnetic coil the electrical energy which has been brought in via the first electrical cable 20a.

The first and second pin-shaped electric connector bodies 18a, 18b, the first and second electric cables 20a, 20b and the first and second electric releasable connections 22a, 22b are optionally of identical design. Therefore, the following description relating to FIG. 3, in which only the first releasable connection 22a is shown, also applies in exemplary fashion to the second releasable connection 22b of the electric connecting device 26.

The first pin-shaped connecting body 18a is arranged on a free and outer surface 30, and for example pointing away from the rail, for example of the first end element 14. In particular, the free and outer surface 30, from which the first pin-shaped connector body 18a projects away outward and here, in particular when viewed in the position of use, vertically upward, is located outside any recesses, drilled holes or openings of the first end element 14.

The first pin-shaped electric connector body 18a has, for example, a circular cross section and projects perpendicularly away from the free and outer surface of the first element 14, here for example when viewed in the position of use, vertically upward. As indicated by dashed lines in FIG. 2, the free and outer surface 30', from which the first pin-shaped electric connector body 18a' projects, can, however, also have a surface normal which runs parallel to the rail or to the longitudinal extent of the magnetic coil body 8 and then is formed on an end face of the first end element 14. As a further alternative, the free and outer surface 30", from which the first pin-shaped electric connector body 18a" projects, can have a surface normal which runs perpendicularly with respect to the rail or with respect to the longitudinal extent of the magnetic coil body 8 and is formed on a side face of the first end element 14.

As is apparent from FIG. 1, the first pin-shaped connector body 18a and the second pin-shaped connector body 18b are arranged on the outer surface 30 of the end element 14, for example symmetrically with respect to a vertical longitudinal center plane of the magnetic coil body 8.

As is shown by FIG. 2, the first pin-shaped connector body 18a has, for example, a truncated-cone-shaped cross section which, for example, widens toward the free and outer surface 30 of the first end element 14.

Figure 3:
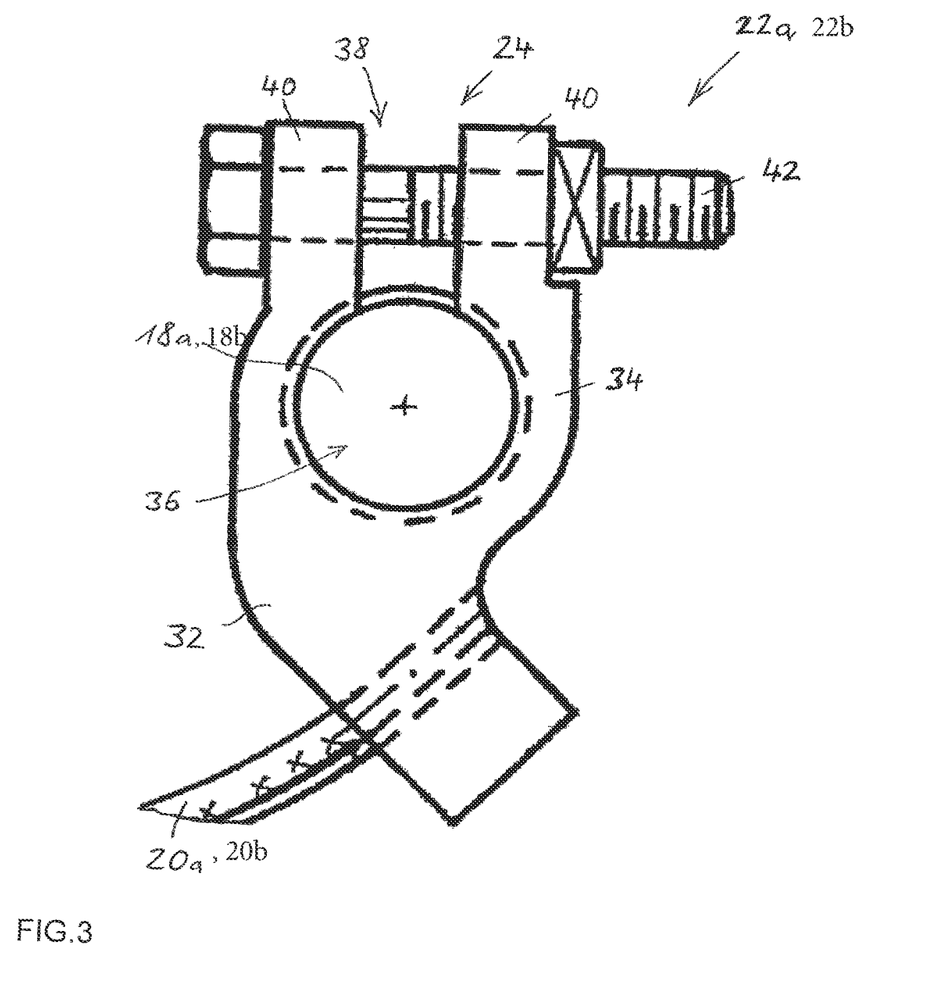
FIG. 3 shows a pole terminal which is clamped to the pin-shaped connector body in FIG. 2.

As is apparent from FIG. 3, the first electric cable 20a can have at the end a pole contact 32 which is connected to the first pin-shaped connector body 18a by the first releasable connection 22a.

The first releasable connection 22a can contain a positively locking and/or frictionally locking connection such as a screwed connection and/or a clamped connection and/or a pressed connection of the pole contact 32 to the first pin-shaped connector body 18a. For example, the first electric cable 20a can be provided at the end with a pole terminal 24 as a pole contact 32, which is connected to the first pin-shaped connector body 18a by a frictionally locking clamped connection.

As can be easily imagined on the basis of FIG. 3, the pole terminal 24 has a ring 34 with a through-opening 36 whose internal diameter can be varied, and in an initial state is larger than the external diameter of the first pin-shaped connector body 18a. The annular pole terminal 24 can then be connected to the first pin-shaped connector body 18a in such a way that the first pin-shaped connector body 18a is firstly inserted into the through-opening 36 in the ring 34 of the pole terminal 24, and the internal diameter of the through-opening 36 of the ring 34 is then reduced until the first pin-shaped connector body 18a is clamped in a frictionally locking fashion in the ring 34 of the pole terminal 24. For this purpose, the ring can have, when viewed in the circumferential direction, an annular gap 38 at which ring ends 40 are formed whose distance from one another can be varied using an adjuster screw 42 in order to adapt the internal diameter of the ring 34.

Instead of an articulated electromagnetic rail brake device 4 as described here it is also possible to provide a rigid electromagnetic rail brake device with an electric connecting device 26 as described above. Furthermore, the arrangement of the two pin-shaped electric connector bodies 18a, 18b is not limited to the surface 30, used here merely by way of example, of the first end element 14. Consequently, any free outer surface on the magnetic coil body 8 or on an element which is attached thereto, and from which surface the two pin-shaped electric connector bodies 18a, 18b then project away, is conceivable.

Figure 4:
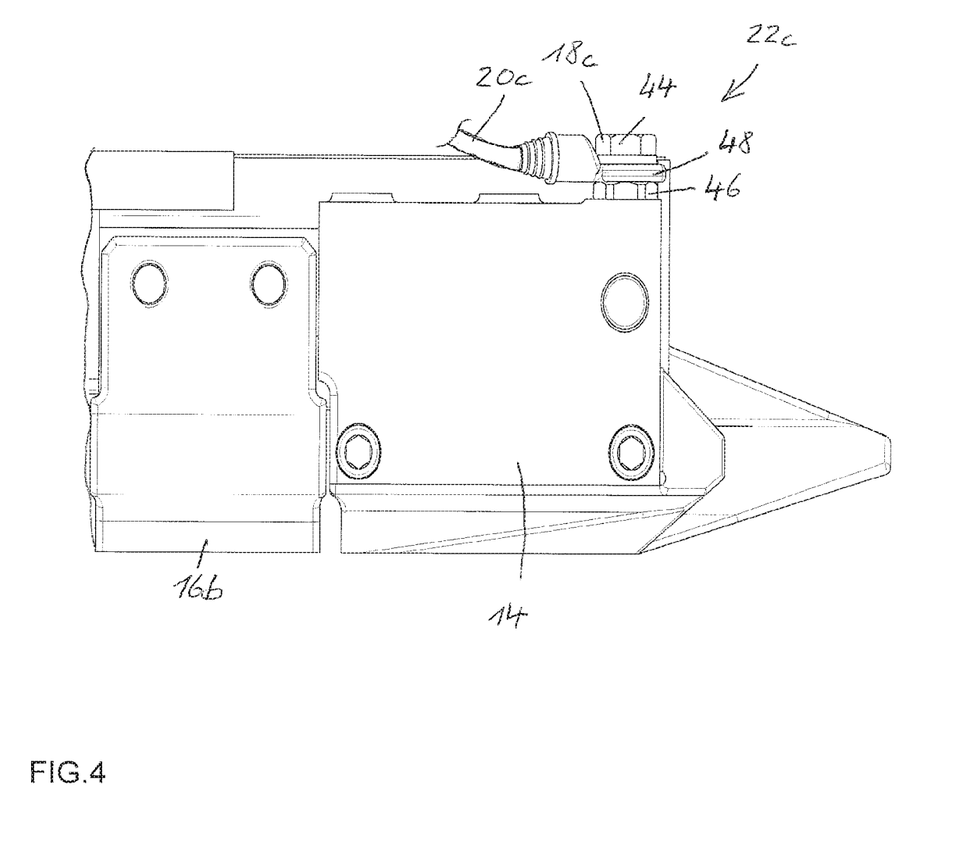
FIG. 4 shows a side view of an end element of the magnetic coil body with a pin-shaped connector body according to a second embodiment, the connector body being arranged on a free and outer surface of the end element.

According to one embodiment which is illustrated in FIG. 4, the pin-shaped electric connector body 18c is formed, for example, by a head screw 44 which can be screwed with its screw shaft into a threaded drilled hole of a threaded bushing 46 which is electrically insulated with respect to the magnetic coil body 8 and which is secured in a drilled hole in the free and outer surface 30 of the first end element 14. The releasable electrical connection 22c then comes about by virtue of the fact that the screw shaft of the head screw 44 projects through an annular cable lug 48 to which the current-conducting electric cable 20c is electrically connected.

In order to carry out a braking operation, the two articulated electromagnets 2 of the articulated electromagnetic rail brake device 4 are lowered onto the rails by the lifting device (not shown here) until the pole shoes 16a, 16b of the magnetic cores 7 of the intermediate element 6 and of the end elements 14, 15 make contact with the rail head and energize the coil windings of the magnetic coil so that the coil current in the magnetic cores of the intermediate elements 6 and of the end elements 14, 15 generates a magnetic flux which is closed by the rail head. The pole shoes 16a, 16b are consequently pulled down onto the rail head and pressed against it with a force corresponding to the magnetic flux. The mobility of the magnetic cores which occurs in the direction of the longitudinal axis of the magnetic coil bodies 8 can permit the magnetic cores also to rest flat on rail heads with differing degrees of wear and allows the desired magnetic flux to be produced and then the braking force to come about by virtue of the frictional engagement between the pole shoes 16a, 16b and the rail head. The dividing walls 10 take up the braking forces arising as a result of the friction between the magnetic cores and the rail head 18 and pass the braking forces on to the magnetic coil body 8, from which they are transmitted to the attachment device and to the lifting device and from there to the bogies of the rail vehicle.

LIST OF REFERENCE NUMBERS

2 Articulated electromagnet
4 Articulated electromagnetic rail brake device
6 Intermediate element 8 Magnetic coil body
10 Dividing walls
14 First end element
15 Second end element
16a/b Pole shoes
18a/b/c Pin-shaped electric connector bodies
20a/b/c Electric cables
22a/b/c Releasable electric connections
24 Pole terminal
26 Connecting device
28 Bar
30 Surface
32 Pole contact
34 Ring
36 Through-opening
38 Annular gap
40 Ring ends
42 Adjuster screw
44 Head screw
46 Threaded bushing
48 Cable lug

The invention claimed is:

1. An electromagnetic rail brake device of a rail vehicle having at least one brake magnet which has a magnetic coil body and at least one magnetic core, wherein the magnetic coil body carries at least one magnetic core winding, and has an electric connecting device through which the at least one magnetic coil winding is supplied with power, wherein the electric connecting device has at least one pin-shaped electric connecting body which is connected via a releasable electric connection to at least one current-conducting electric cable which is led into the at least one pin-shaped connector body from the outside with respect to the brake magnet, wherein the at least one pin-shaped connector body is arranged on a free and outer surface of the magnetic coil body or of an element that is connected to the magnetic coil body, wherein the at least one electric cable has at the end a pole contact which is connected to the at least one pin-shaped electric connector body by the releasable electric connection, wherein the at least one pin-shaped electric connector body is formed by a head screw which is screwable into a threaded bore of a threaded bushing which is electrically insulated with respect to the magnetic coil body and is secured in a drilled hole in the free and outer surface, wherein a screw shaft of the head screw projects through the pole contact which is a cable lug and to which the at least one current-conducting electric cable is electrically connected.

2. The electromagnetic rail brake device of claim 1, wherein the at least one pin-shaped electric connector body projects away perpendicularly from the free and outer surface.

3. The electromagnetic rail brake device of claim 1, wherein an end element is rigidly connected to the magnetic coil body at each of the longitudinal ends of the magnetic coil body, and wherein the at least one pin-shaped electric connector body is arranged on a free and outer surface of each end element.

4. The electromagnetic rail brake device of claim 1, wherein a first electric cable is provided as a positive pole and a second electric cable is provided as a negative pole, wherein the first electric cable which represents the positive pole is releasably connected to a first pin-shaped electric connector body via a first releasable electric connection, and the second electric cable which represents the negative pole is releasably connected to a second pin-shaped electric connector body via a second releasable electric connection.

5. The electromagnetic rail brake device of claim 4, wherein the first pin-shaped connector body and the second pin-shaped electric connector body are arranged on the free and outer surface in a symmetrical fashion with respect to a vertical longitudinal center plane of the magnetic coil body.

6. The electromagnetic rail brake device of claim 1, wherein the free and outer surface has a surface normal which points vertically upward or downward or to the side in the position of use of the brake magnet.

7. The electromagnetic rail brake device of claim 1, wherein the device is a rigid electromagnetic rail brake device or articulated electromagnetic rail brake device.

8. A rail vehicle having at least one electromagnetic rail brake device as claimed in claim 1.

* * * * *